(12) United States Patent
Liu (10) Patent No.: US 11,628,904 B2
(45) Date of Patent: Apr. 18, 2023

(54) GRIP FOR A BIKE

(71) Applicant: Zi-Ju Liu, Taipei (TW)

(72) Inventor: Zi-Ju Liu, Taipei (TW)

(73) Assignee: Zi-Ju Liu, Taipei (TW)

( * ) Notice: Subject to any disclaimer, the term of this patent is extended or adjusted under 35 U.S.C. 154(b) by 0 days.

(21) Appl. No.: 16/161,912

(22) Filed: Oct. 16, 2018

(65) Prior Publication Data

US 2019/0185104 A1 Jun. 20, 2019

(30) Foreign Application Priority Data

Oct. 16, 2017 (TW) .................................. 106135578

(51) Int. Cl.
| | |
|---|---|
| *B62K 21/26* | (2006.01) |
| *B62K 23/04* | (2006.01) |
| *B62K 23/02* | (2006.01) |
| *G06F 3/00* | (2006.01) |
| *B62K 11/14* | (2006.01) |

(52) U.S. Cl.
CPC .............. *B62K 21/26* (2013.01); *B62K 23/02* (2013.01); *B62K 23/04* (2013.01); *G06F 3/00* (2013.01); *B62K 11/14* (2013.01)

(58) Field of Classification Search
CPC ........ B62K 21/26; B62K 11/14; B62K 23/02; B62K 23/04
See application file for complete search history.

(56) References Cited

U.S. PATENT DOCUMENTS

| | | | | |
|---|---|---|---|---|
| 4,623,954 A | * | 11/1986 | Schott ...................... | B62J 6/005 362/200 |
| 5,083,108 A | * | 1/1992 | Guest ........................ | B62J 3/00 340/384.6 |
| 7,481,560 B1 | * | 1/2009 | Jaw ............................ | B62J 6/00 16/421 |
| 2010/0053984 A1 | * | 3/2010 | Wang ........................ | B62J 6/00 362/474 |
| 2010/0141146 A1 | * | 6/2010 | Lu ............................. | B62J 6/005 315/77 |
| 2016/0083033 A1 | * | 3/2016 | Liu ........................... | B62J 6/003 362/474 |
| 2017/0080993 A1 | * | 3/2017 | Bierwerth .............. | B62M 25/08 |
| 2018/0156631 A1 | * | 6/2018 | Huard ................... | G01C 21/265 |

\* cited by examiner

*Primary Examiner* — Thomas C Diaz (57) ABSTRACT

A grip for a bike is disclosed, which comprises a body, a sleeve and a cap. The body has a hollow tube and at least one connector. The hollow tube installs the body onto one of a handle of the bike. The connector extends axially along a lengthwise portion of the body from another end of the body. The sleeve covers the hollow tube. The cap overlies the connector and connecting toward the sleeve to form an inner space. Accordingly, the grip of the present disclosure provides a mean of modular connections for a handle of a bike, which achieves a high degree of customization flexibility and easy assembly advantages.

11 Claims, 7 Drawing Sheets

GRIP FOR A BIKE

FIELD OF THE INVENTION

Embodiments of the present disclosure relate to a grip, and especially toward grips for a bike.

BACKGROUND

Cylindrical handlebar grips have been utilized on the ends of handlebars of bicycles and motorcycles (collectively "bike") for decades. These grips are typically made of a soft polymer that both improves a user's ability to grasp the handlebars of the cycle and cushions the hand against the effect of vibrations and small impacts as the cycle is ridden.

Further, in order to make new application other than just focusing on the grasp of the handles of the bike, some grip manufacture make new grip with fancy electronic appliances. But such electronic appliance is an independent component compared to the grip itself. Normally they just screw or fastened on the grip or the handle bar.

Therefore, there is still a need to improve adequate grip structure to maintain product and user safety for installing new electronic appliance including low cost, comfort of grasp, high degree of customization flexibility and easy assembly advantages.

SOME EXEMPLARY EMBODIMENTS

These and other needs are addressed by the present disclosure, wherein an approach is provided for grips that is easy assembly and achieves a high degree of customization flexibility.

According to one aspect of an embodiment of the present disclosure, the grip for a bike comprises a body, a sleeve and a cap. The body has a hollow tube and at least one connector. The hollow tube installs the body onto one of a handle of the bike. The connector extends axially along a lengthwise portion of the body from another end of the body. The sleeve covers the hollow tube. The cap overlies the connector and connecting toward the sleeve. The connector fastens the sleeve and the cap with a screw.

According to another aspect of the present disclosure, the cap of the grip covered onto the connector that is operatively associated with a circumference of the body which forms an inner space. The inner space is configured for receiving According to yet another aspect of an embodiment of the present disclosure, the grip further comprises at least one wiring track and at least one installing zone. The installing zone may install a electronic module and the electronic module is electrically connected to the functional module through the corresponding wiring track.

According to other aspect of an embodiment of the present disclosure, a grip comprises a body and a cover. The body has a hollow tube and at least one protrusion. The hollow tube on an end of the body is configured for installing the body onto one of a handle of the bike. The protrusion extends axially along a lengthwise portion from another end of the body. The cover covers the body, forms an inner space with the protrusion and has an operating zone formed on a side of the cover opposite to the protrusion, wherein the inner space is receiving the functional module, and the functional module is electrically connected to the operating zone.

According to yet other aspect of an embodiment of the present disclosure, the body of the grip further comprises a container and a holding notch. The container is formed at a first side of body. The holding notch is formed between an outer surface of the container and inner surface of the body which is configured for inserting a handle of the bike from a second side of the body. The container may receive other electronic components that requires greater space than the above-mentioned installing zone.

BRIEF DESCRIPTION OF THE DRAWINGS

The disclosure is illustrated by way of example, and not by way of limitation, in the figures of the accompanying drawings in which like reference numerals refer to similar elements and in which.

DESCRIPTION OF THE PREFERRED EMBODIMENT

Embodiments of the apparatus and/or methods are disclosed. In the following description, for purposes of explanation, numerous specific details are set forth in order to provide a thorough understanding of the embodiments of the disclosure. It is apparent, however, to one skilled in the art that the present disclosure may be practiced without these specific details or with an equivalent arrangement.

Figure 1:
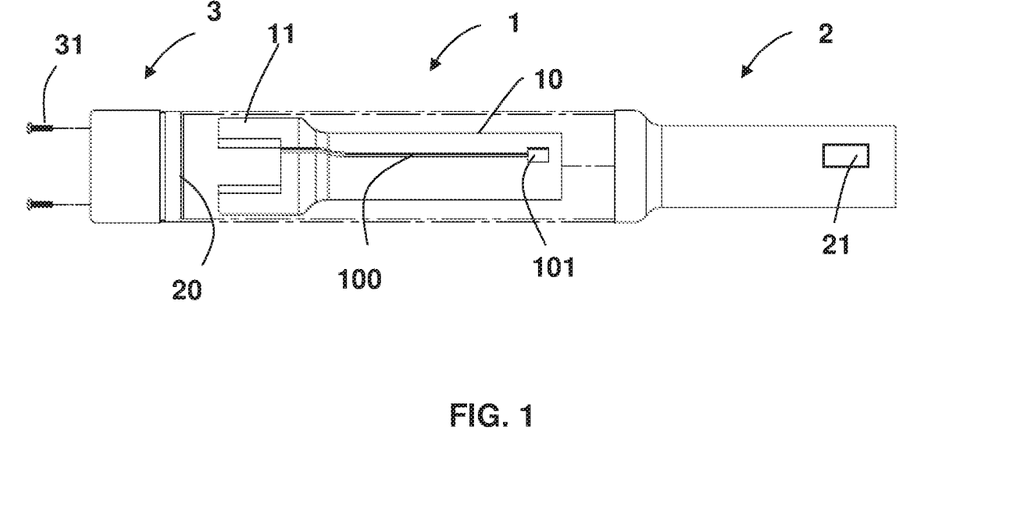
FIG. 1 is an exploded diagram of a grip for a bike in accordance with an embodiment of the present disclosure.
Figure 2:
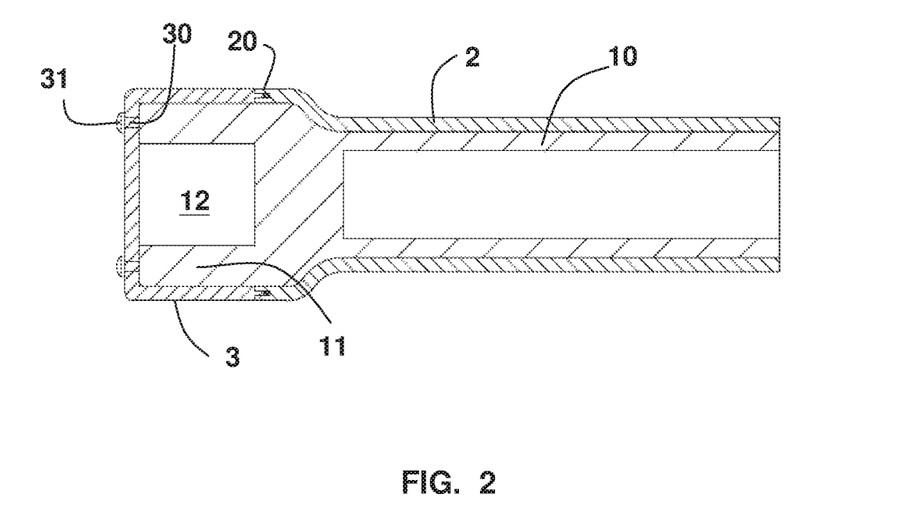
FIG. 2 is a sectional-view diagram of a grip of FIG. 1 after assembled onto a handle of the bike.

With reference to FIGS. 1 and 2, FIG. 1 is an exploded diagram of a grip for a bike in accordance with an embodiment of the present disclosure; and FIG. 2 is a sectional-view diagram of a grip of FIG. 1 after assembled onto a handle of the bike. In this embodiment, the grip comprises a body 1, a sleeve 2 and a cap 3. The body 1 has a hollow tube 10 and at least one connector 11. The hollow tube 10 installs the body 1 onto one of a handle of the bike. The connector 11 extends axially along a lengthwise portion of the body 1 from another end of the body 1. The sleeve 2 covers the hollow tube 10. The cap 3 overlies the connector 11 and connects toward the sleeve 2. The connector 11 fastens the sleeve 2 and the cap 3 with a screw 31.

As shown in FIG. 2, an inner space 12 will be formed when the cap 3 covered onto the connector 11 that is operatively associated with a circumference of the body 1, and the inner space 12 is configured for receiving a functional module (not shown). However, in order to prevent waterfall or any other humidity that take effect on the functional module, especially water goes into the inner space 12 form the connection of the cap 3 and sleeve 2. The grip further comprises a waterproof ring located between the cap 3 and sleeve 2.

Figure 3:
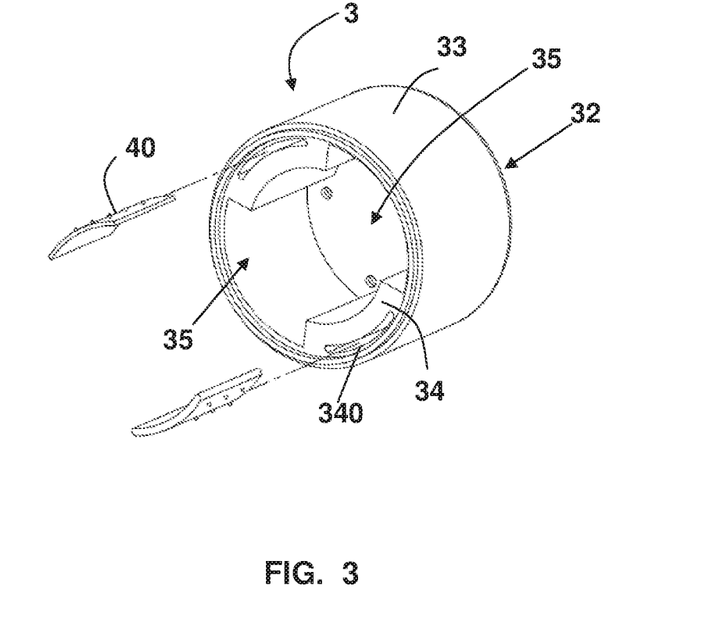
FIG. 3 is an exemplary diagram of the cap of the grip in accordance with an embodiment of the present disclosure.

With reference to FIG. 3, FIG. 3 is an exemplary diagram of the cap of the grip in accordance with an embodiment of the present disclosure. In this embodiment, the cap comprises a top surface 32 and a side surface 33. The top surface 32 has at least one screw hole 30. Each of the screw hole 30 is corresponded to the connector 11 that is configured for fastening the sleeve 2 and the cap 3 with a screw 31. The side surface 32 has two inserting slots 34 and two inserting notches 35 mounted on the inner side of the cap 3. the inserting slots 34 are oppositely mounted and each inserting slot has a slot 340 in a shape of arc. The slot 340 is configured for receiving a light emitting unit 40 that is able to let the light emitting toward the side surface 33. Two inserting notches 35 formed adjacent to the inserting slots 34, and are configured for receiving the connector 11 that creates the inner space 12.

In one embodiment, the side surface 33 may be made with transparent or semi-transparent material. In another embodiment, the side surface 33 may further comprise an opening on it.

In an embodiment, the functional module located inside the inner space 12 may be a power module that drives the emitting unit 40. However, the functional module may also be or includes control circuitry, battery, memory or other electronic units. For example, the functional module may include a gyroscope. The gyroscope is able to detect the orientation and angular velocity of the bike. When the bike is making a turn, the gyroscope can trigger the emitting unit 40 of the corresponding grip.

Figure 4:
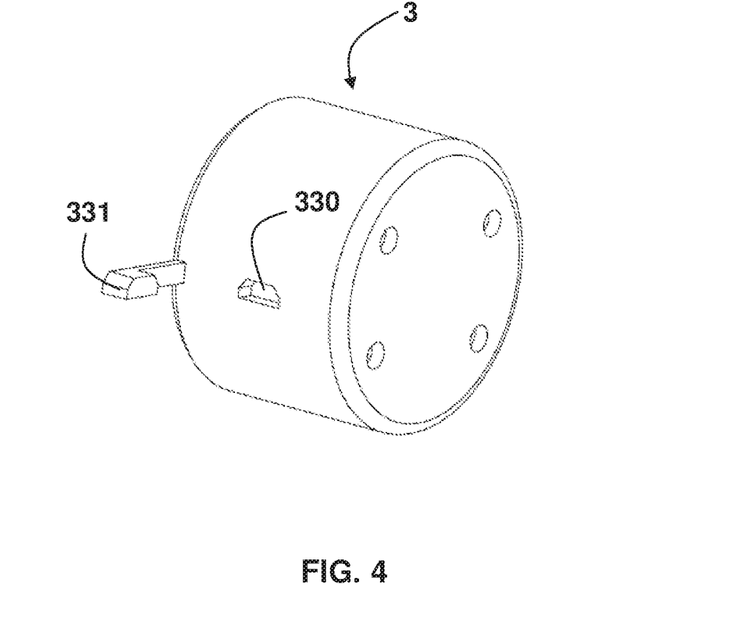
FIG. 4 is an exemplary diagram of a cap that has a USB slot in accordance with an embodiment of the present disclosure.

With reference to FIG. 4, FIG. 4 is an exemplary diagram of a cap that has a USB slot in accordance with an embodiment of the present disclosure. In this embodiment, the cap 3 further comprises a USB slot 330 and a bolt 331, wherein the bolt 331 is configured for securing the USB slot 330. The USB slot 330 is connected to the functional module, which is able to achieve functions as charging or data retrieving.

Figure 5:
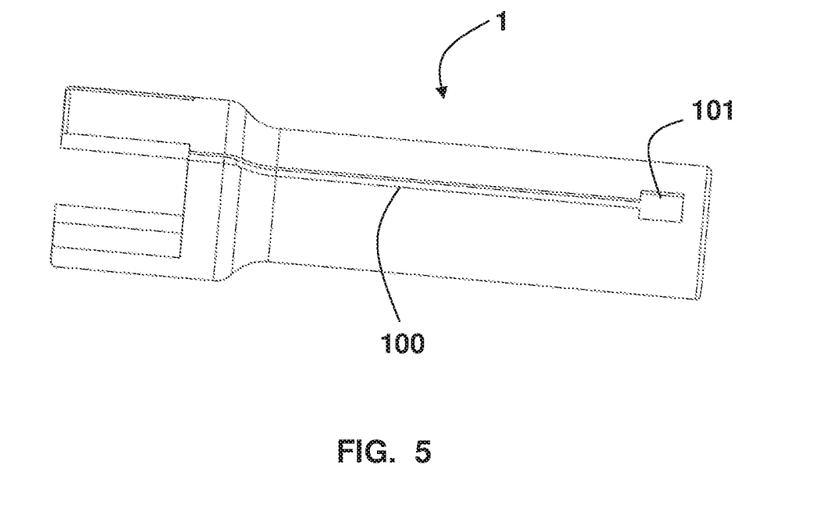
FIG. 5 is an exemplary diagram of a body in accordance with an embodiment of the present disclosure.
Figure 6:
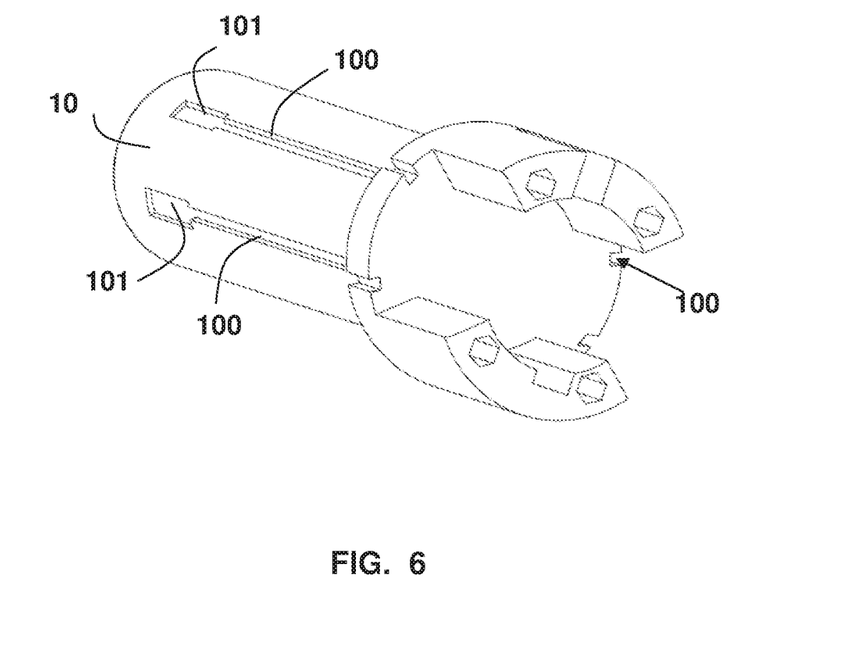
FIG. 6 an exemplary diagram of a body in accordance with another embodiment of the present disclosure.

With reference to FIGS. 1, 5 and 6, FIG. 5 is an exemplary diagram of a body in accordance with an embodiment of the present disclosure. In this embodiment, the body 1 further comprises a wiring track 100 and an installing zone 101. The location of the sleeve 2 corresponded to the installing zone 101 further comprises an operating zone 21. In one embodiment, the operating zone 21 may be a button. The installing zone 101 receives an electronic module. The electronic module is electrically connected to the functional module through the wiring track 100. Once the button is pressed, the functional module is triggered to drive the electronic module for a particular application (e.g., driving the emitting unit to emit light).

With reference to FIG. 6, FIG. 6 an exemplary diagram of a body in accordance with another embodiment of the present disclosure. In this embodiment, the surface of the hollow tube 10 of the body 1 further comprises multiple wiring tracks 100 and multiple corresponding installing zones 101. Since each of wiring tracks 100 and installing zones 101 are independent located, the signal interferences and wiring complexities can be reduced.

Figure 7:
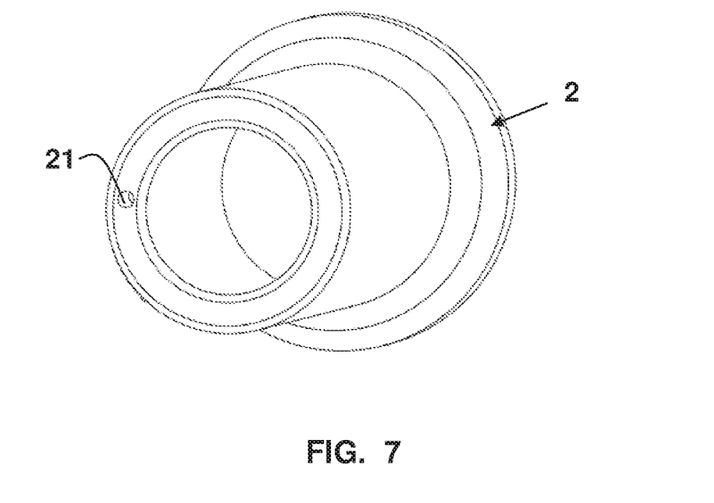
FIG. 7 a rear-view diagram of a sleeve in accordance with an embodiment of the present disclosure.

With reference to FIG. 7, FIG. 7 a rear-view diagram of a sleeve in accordance with an embodiment of the present disclosure. The installing zone 101 is not like aforementioned with is formed on the surface of the hollow tube 10. In this embodiment, the installing zone 101 is located at a rear end of the hollow tube 10 and communicates with the wiring track 100. The operating zone 21 of the sleeve 2 is a socket. The socket may be an earphone plug or another suitable electric plug.

Figure 8:
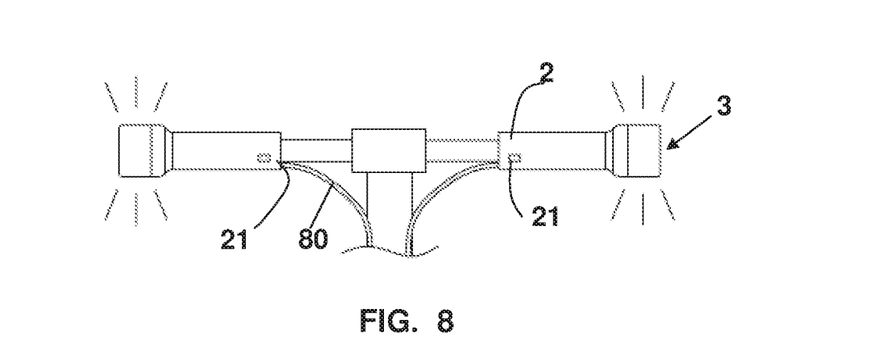
FIG. 8 is a rear view diagram of grips mounted on the handle of the bike in accordance with an embodiment of the present disclosure.
Figure 9:
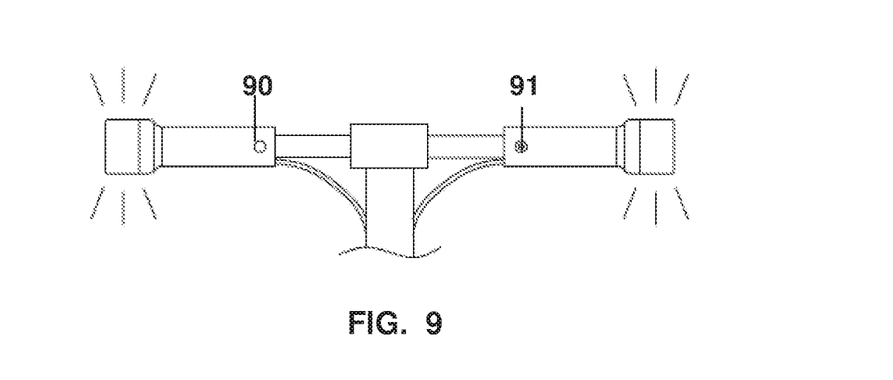
FIG. 9 is a front view diagram of grips mounted on the handle of the bike in accordance with an embodiment of the present disclosure.

With reference to FIGS. 1, 6, 7, 8 and 9, FIG. 8 is a rear view diagram of grips mounted on the handle of the bike in accordance with an embodiment of the present disclosure. FIG. 9 is a front view diagram of grips mounted on the handle of the bike in accordance with an embodiment of the present disclosure. As shown in FIG. 8, the cap 3 is adapted as directional indicators which two grips are mounted on two ends of the handle bar of the bike respectively. The operating zones 21 of the sleeves 2 are respectively mounted at inner ends of the handle bar which are corresponded to the thumbs when a person holds the grips and rides the bike.

Further, when the operating zone 21 of the sleeve 2 is a socket. The socket is configured for receiving an external wiring component 80. Such wiring component 80 can be signal wire that is applied to an electric bike which connects to a motor. When a person spins the grip of the handle, the wiring component 80 transmits triggering signals to the motor to rotate the wheel of the bike.

With reference to FIGS. 1 and 9, the operating zone 21 may be a transparent or opening portion that is able to place a lamp 90 (e.g., LED lamp) or a camera 91. In one embodiment, the driver of the lamp 90 is an electronic component that located inside the installing zone 101, which electrically connected to the functional module of the inner space 12. The functional module (i.e., power module) drives the lamp 90 through the wiring track 100. Similarly, the driver of the camera 91 is placed inside the installing zone 101, and transmits and stores image data to the functional module (i.e., a memory unit) through the wiring track 100.

Figure 10:
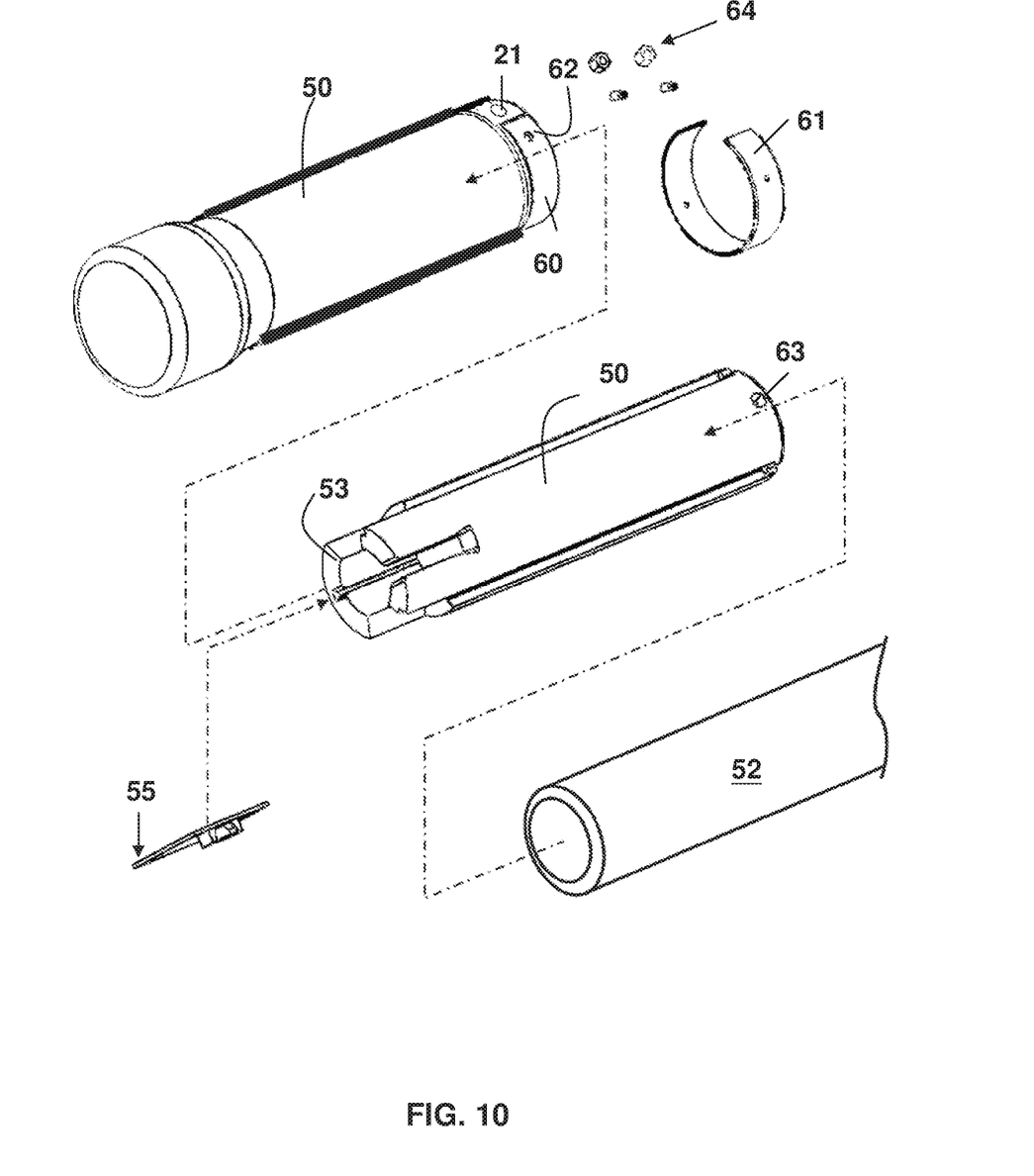
FIG. 10 is an exploded diagram of a grip in accordance with an embodiment of the present disclosure.
Figure 11:
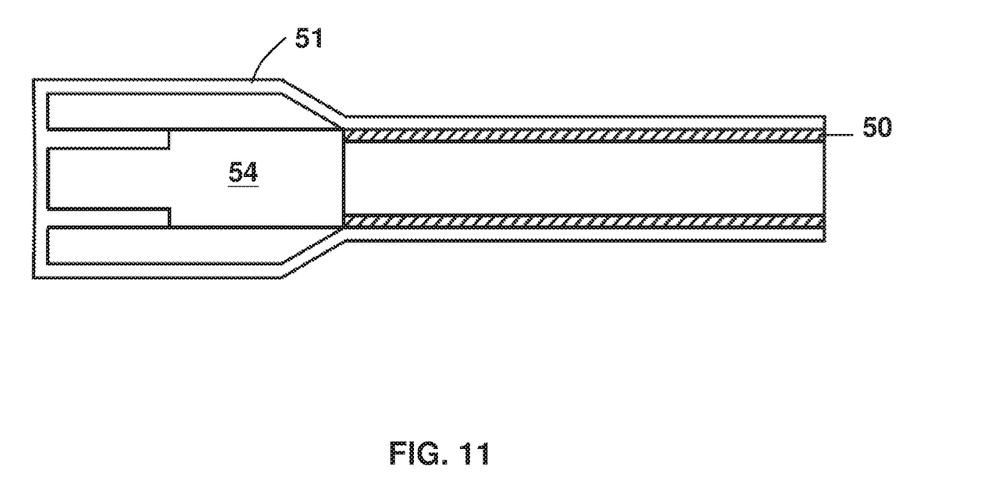
FIG. 11 is a sectional-view diagram of the grip in accordance with an embodiment of the present disclosure.

With reference to FIGS. 10 and 11, FIG. 10 is an exploded diagram of a grip in accordance with an embodiment of the present disclosure. In this embodiment, the grip comprises a body 50 and a cover 51. The body 50 has a hollow tube and at least one protrusion 53.

As shown in FIGS. 10 and 11, the hollow tube on an end of the body 50 is configured for installing the body 50 onto one of a handle 52 of the bike. The protrusion 53 extends axially along a lengthwise portion from another end of the body 50.

The cover 51 covers the body 50, forms an inner space 54 with the protrusion 53 and has an operating zone 21 formed on a side of the cover 51 opposite to the protrusion 53, wherein the inner space 54 is receiving the functional module 55, and the functional module 55 is electrically connected to the operating zone 21.

Figure 12:
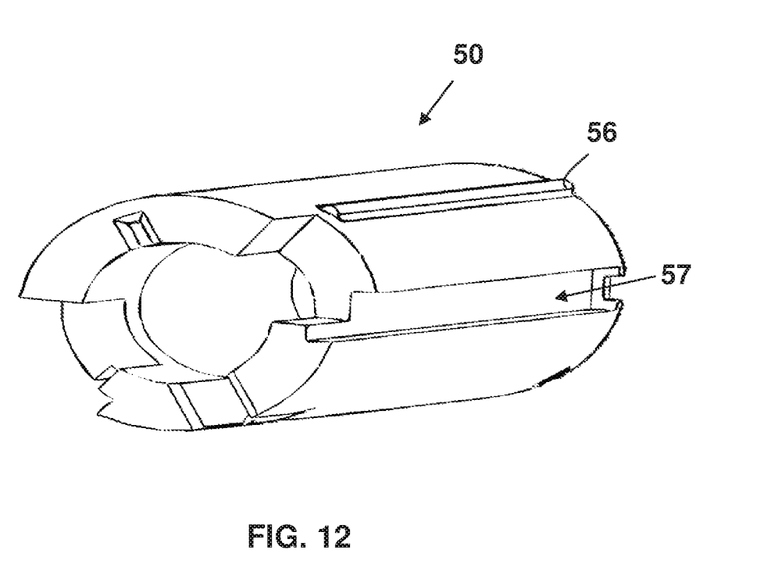
FIG. 12 is an exemplary diagram of a body in accordance with an embodiment of the present disclosure.

With reference to FIG. 12, FIG. 12 is an exemplary diagram of a body in accordance with an embodiment of the present disclosure. In this embodiment, the cover 51 is made of elastic material. As shown in FIG. 12, the body 50 further comprises at least one rib 56 and at least one wiring slot 57 formed on an outer surface of the body 50. The rib 56 provides better friction when the cover 51 is covered over the body 50 which makes the cover 51 more tightly fastened on the body 50. As a person skilled in art, the inner surface of the cover 51 may further comprises a corresponding notch that is adaptively for engaging the rib 56 as the cover 51 covers onto the body 50.

The wiring slot 57 is configured for a wire electrically connects between the operating zone 21 and the functional module 55, or extends outwardly of the body 50 from the functional module 55. It is noted that when the cover 51 covers the body 50, it provides shelter and protection of the wires.

As shown in FIG. 10. In this embodiment, the cover 51 further comprises an arcuate channel 60 adjacent to the operating zone 21, which is configured for fastening tightly the body 50 and the cover 51 on the handle 52 of the bike with a band clamp 61. In one embodiment, the band clamp 61 is a C-clamp. As shown in FIG. 10, the arcuate channel 60 and the body 50 has a clamping holes 62, 63 respectively which is adaptively for a screw assembly 64 engaging one end of the band clamp 61 with screw abutting the other end of the band clamp 61.

Figure 13:
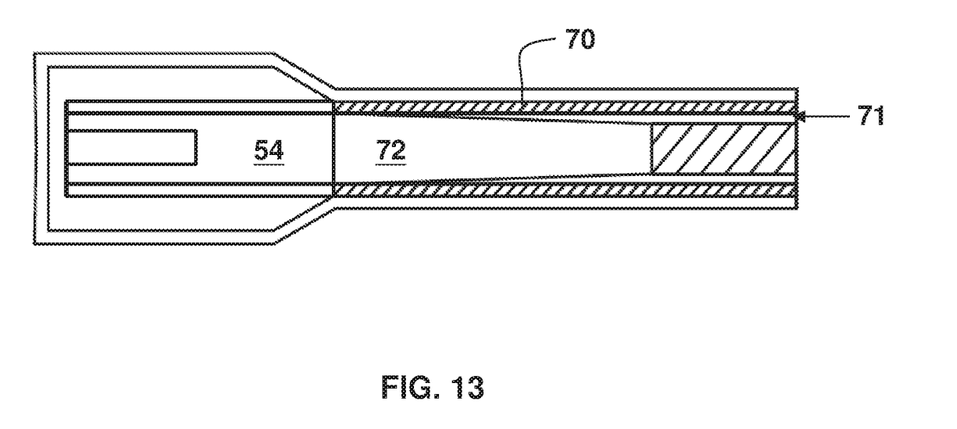
FIG. 13 is a sectional-view diagram of the grip in accordance with another embodiment of the present disclosure.

As shown in FIG. 13, FIG. 13 is a sectional-view diagram of the grip in accordance with an embodiment of the present disclosure. In this embodiment, on a first side inside of the body 70 further comprises a container 72, and a holding notch 71 is formed between an outer surface of the container 72 and inner surface of the body 70. The handle of the bike inserts into the body 70 from a second side of the body 70 along through the holding notch 71. The container 72 is communicated with the inner space and is able to receive a battery or other electronic components that electrically connects to the functional module.

Figure 14:
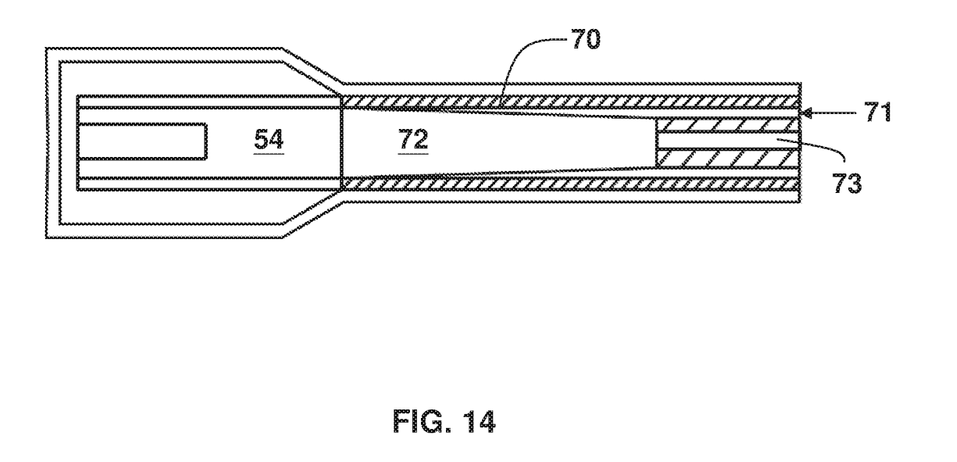
FIG. 14 is a sectional-view diagram of the grip in accordance with other embodiment of the present disclosure.

As shown in FIG. 14, FIG. 14 is a sectional-view diagram of the grip in accordance with another embodiment of the present disclosure. In this embodiment, the container 72 of the body 70 further comprises an opening 73. The opening 73 is formed on the second side of the body 70 and communicates with the handle of the bike. The benefit of that current embodiment is that the wire can connect between two grips inside the handle bar.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A grip for a bike comprising:
    a body having
        a hollow tube integrally formed on a first end of the body, is configured for installing the body onto one of the bike handle, and comprising
            a wiring track and an installing zone formed on an outer surface of the hollow tube;
            a container formed inside the hollow tube that creates a holding notch to be formed between the outer surface of the container and the inner surface of the hollow tube, wherein the bike handle is inserted through to holding notch into the hollow tube; and
        a protrusion extended axially along a lengthwise portion from the first end of the body that is connected to the hollow tube and comprising
            two opposite connectors defining an inner space; and
            two first openings, each first opening being formed between two adjacent connectors respectively;
    a cap being placed onto the protrusion to encompass the inner space having
        two inserting notches, and each inserting notch being configured for receiving the corresponding connector of the protrusion; and
        two inserting slots corresponded to each of the first opening of the protrusion and are configured for receiving electronic components, wherein the electronic components are electrically connected to a functional module that is located inside the inner space; and
    a sleeve covering the body, being selectively connected or integrally formed with the cap and having an operating zone, and the location of the operating zone is corresponding to the installing zone, wherein
        the operating zone electrically communicated with the installing zone, and electrically communicates to the functional module of the inner space via the wiring track; and
        the container is communicated with the inner space.

2. The grip as claimed in claim 1, wherein the cap further comprises a USB slot.

3. The grip as claimed in claim 1, wherein a top surface of the cap having at least one screw hole, and each of the screw hole is corresponded to the connector that is configured for fastening the sleeve and the cap with a screw.

4. The grip as claimed in claim 1, wherein the inserting slot is configured for receiving a light emitting unit.

5. The grip as claimed in claim 1, wherein a electronic module is placed inside the installing zone, and the operating zone is configured for triggering the functional module to drive the electronic module.

6. The grip as claimed in claim 1, wherein the operating zone is a socket that is configured for receiving an external wiring component.

7. The grip as claimed in claim 1, wherein
    at least one rib are formed on an outer surface of the body; and
    at least one guiding notch is formed at inner surface of the sleeve which is corresponded to the rib.

8. The grip as claimed in claim 1, wherein the sleeve further comprises an arcuate channel adjacent to the operating zone, which is configured for fastening the body and the sleeve on the handle of the bike with a band clamp.

9. The grip as claimed in claim 8, wherein the band clamp is a C-clamp.

10. The grip as claimed in claim 1, wherein the container is configured for receiving a battery and the battery is electrically connected to the functional module.

11. The grip as claimed in claim 10, wherein the body further comprises
    an opening being a through hole formed at first end of the body, and the opening is configured for communicating the container and the other bike handle.

\* \* \* \* \*